J. W. Ross.
Inkstand.
No. 39,754. Patented Sept. 1, 1863.

Witnesses:
Th. J. Mazall
Albert W. Brown

Inventor:
Joseph W. Ross

UNITED STATES PATENT OFFICE.

JOSEPH W. ROSS, OF BOSTON, MASSACHUSETTS.

IMPROVEMENT IN INK-WELLS.

Specification forming part of Letters Patent No. 39,754, dated September 1, 1863.

*To all whom it may concern:*

Be it known that I, JOSEPH W. ROSS, of Boston, in the county of Suffolk and State of Massachusetts, have invented certain new and useful Improvements in Ink Wells or Fountains; and I do hereby declare that the following description, taken in connection with the accompanying drawings, hereinafter referred to, forms a full and exact specification of the same, wherein I have set forth the nature and principles of my said improvement, by which my invention may be distinguished from all others of a similar class, together with such parts as I claim and desire to have secured to me by Letters Patent.

Figure 1:
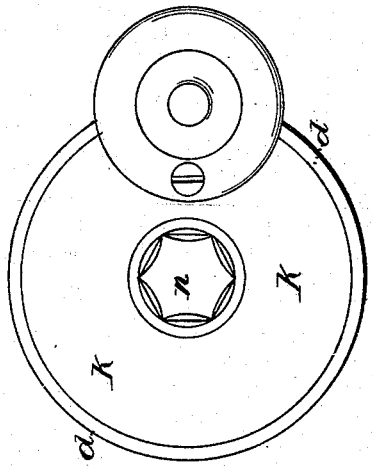
Figure 2:
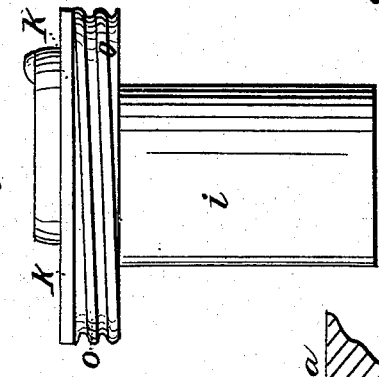
Figure 4:
Figure 5:
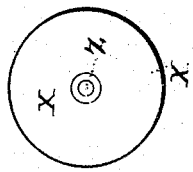
Figure 3:
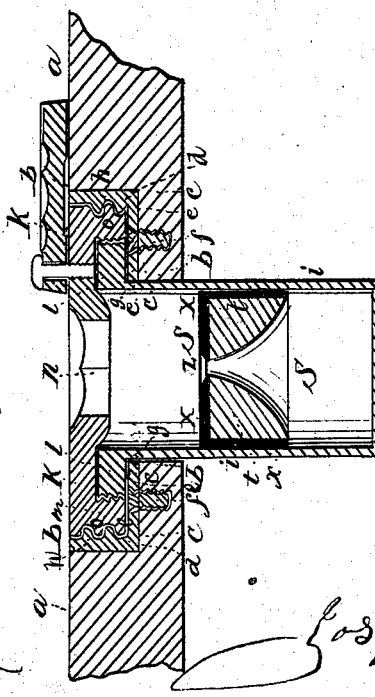

The figures of the accompanying plate of drawings represent my improvements. Figure 1 is a plan or top view. Fig. 2 is a side view. Fig. 3 is a central vertical section, and Figs. 4 and 5 detail views, to be hereinafter referred to.

The present invention relates principally to certain new and useful improvements in the mode of manufacturing the "floats" used in ink wells or fountains, or for other analogous purposes, and as the reasons and objects for the use of the same have been particularly specified in the specification accompanying the Letters Patent granted to me, bearing date April 16, 1861, on an improved ink-well, it is not therefore necessary that they should be herein again mentioned; but, however, as the special object of the float is to obviate as much as possible the exposure of the ink's surface to the external atmosphere, which causes its rapid evaporation and deterioration, it is plainly evident that the closer the float can be made to fit or play in the well without impairing its floating qualities, the more successfully the object of its use can be obtained.

Heretofore, in the manufacture of the floats under my aforesaid Letters Patent, cork has been the only material which I have employed, because of its great buoyancy, and thus in that respect specially adapted for my purpose; but experience has shown that with floats made only of cork the objects aimed at in their use could not be so successfully attained as was desired, from the fact that the porous nature of the cork and consequent capillary attraction of its particles upon the liquid soon causes a swelling or enlargement of the same, thereby rendering it liable, if made to fit or play in the least degree close in the well, to be clogged or prevented from freely operating. A still further objection to the use of cork floats is that its peculiar properties, as specified, necessitated the making of them quite thin, thereby rendering them extremely liable when impinged against by the pen to be overturned and otherwise disarranged in their well.

In the manufacture and use, therefore, of these floats, I have found the following qualities to be necessary in order to secure their almost perfect operation—viz: First, that a smooth friction-surface should be presented by the float to the sides of the well; second, that the floats should be made of such a substance or combination of substances as are non-susceptible of being increased or enlarged in bulk from immersion in liquids; third, that a considerable thickness or depth should be given to the float; and, fourthly and lastly, combining with each and all of the above in the float a sufficient amount of buoyancy.

In experimenting with different materials, to produce a float which would possess each and all of the stated requisites, it was found that for its buoyancy cork and other similar substances were the only materials that could be practically used, and that, therefore, in order to give a smooth friction-surface to its sides, and to insure its close play within the well, with no danger of being clogged by the swelling of the cork or other similar substances used, it was necessary that it (the cork) should be incased within a suitable thickness of such a material as could be made to have a smooth friction-surface, and not only a non-absorbent of the ink or liquid, but also not liable to corrosion by the acids of the ink, &c.

Although by the use of metals, glass, and other similar substances for a casing to the cork portion of the float, a smooth friction-surface could be imparted therewith to the float, yet the inevitable corrosion of the same, by immersion in the ink or liquid, and their great specific gravity, it is evident would forbid their use; but hard vulcanized india-rubber or gutta-percha, from their well-known properties, were found to be the only substances possessing the peculiar requisites deemed so essential for a perfect operating-float, and therefore the present invention consists in combining with a float made of cork, or other similar substances of sufficient buoyancy, a casing, either partially or wholly covering the same, that is, made of hard vulcanized india-rubber or gutta-percha, or their various compounds, the two being combined as above specified and for the purposes described.

Another improvement that I have also made in wells or fountains for containing ink, &c., and which constitutes a part of the present invention, consists in the attachment, by means of screws, rivets, or otherwise, of a screw-socket to the aperture made in the top of the desk for the reception of the well, the objects of which are to facilitate the insertion of the wells within the desk, and to obviate the necessity of the employment of a peculiar-shaped tool for the formation of the female screw within the desk to receive the male screw of the ink-well, as will be hereinafter more particularly described, and the advantages of which will be evident.

$a\ a$ in the accompanying drawings represent the top of any ordinary desk, in which to receive the ink-well. A circular opening, $b$, is so made as to form a shoulder, $c$, in and around the lower portion thereof. In the opening $b$, I place a hollow and shallow metallic casing, $d$, the bottom plate, $e$, of which is secured by screws $ff$, &c., or otherwise, to the upper surface of the said shoulder $c$, the external diameter of the casing $d$ being equal to the larger diameter of the opening $b$, so as to closely fit therein. Through the center of the bottom plate, $e$, of said socket $c$, a circular opening, $g$, is made, corresponding in diameter to that of the lower portion of the aperture $b$, and upon the inside surface of the said socket a female screw-thread, $h$, is formed, to be hereinafter referred to.

$i\ i$ is the ink-well or tube for the reception of the ink, $k\ k$ its top plate, attached thereto by means of a male and female screw, respectively formed upon the shoulder $l$ of the ink-well and the inner surface of the lip $m$ on the under side of the said top plate, $k$.

$n$ is a polygonal-shaped opening, made in the center of the top plate, and, extending entirely through the same, forms a means of communication to the ink-well.

$o\ o$ is a male screw-thread, formed upon the exterior periphery of the lip $m$, corresponding to the female screw of the socket $c$, above referred to, and which, by the insertion of the proper key (represented and set forth in the drawings and specification accompanying my aforesaid Letters Patent) into the said opening $n$, can be so screwed into the socket $c$ as to have the top plate, $k$, flush with the desk, as represented, thereby preventing its removal without the said key being used, the shoulder $c$ of the opening $b$, which is the bearing for the shoulder $l$ of the ink-well, forbidding—after the well has been inserted in the desk, as described—the detachment of the well from its top plate, as is apparent by inspection of the drawings.

Heretofore, in the use of the ink-wells or fountains, they have been screwed directly into the opening of the desk for the same, without the intervention of the screw-socket above described; but the formation of the female screw-thread in the said opening required the use of a peculiar-shaped tool made especially for that purpose, the disadvantages of which, in the practical and general use of the wells, are evident, whereas, by my improvements above specified, the use of such a tool is entirely dispensed with, and the insertion of the wells thereby greatly facilitated, the special object desired to be obtained by either mode being to so secure the well within the desk as to prevent tampering therewith, and too frequent removals by the scholars of schools, &c., for which my wells are especially designed.

Inserted within the well $i$, previous to its being attached to its top plate, as described, and to float upon the ink therein, is a float, $s$, of the same diameter as that of its well-chamber, and which is constructed as follows: $t$ is the cork forming the central portion thereof, around which, and almost incasing the same, is a thin coating of hard vulcanized india-rubber or gutta-percha, $x$, an aperture, $z$, being made through the center of the float as a passage for the ink to the pen when the latter is inserted within the well. By thus constructing the float, a smooth friction-surface is imparted to its sides bearing upon the surface of the well. Its close and sure play obtained, and the protective covering of rubber for the cork, as described, preventing its swelling or enlargement from immersion in the ink, thereby permits the use of a deep float, results that never before were secured by the use of cork or other similar substances alone, and the many advantages of which in ink-wells have been hereinbefore particularly set forth.

Various forms can be given other than those represented, not only to the top surface of the float, but also to its sides, as, for instance, for the top, convex, concave, &c., and for the sides, polygonal, circular, &c., it being understood, however, that the horizontal section of the float must necessarily conform to that of the well in its contour.

In lieu of covering the whole surface of the cork with the hard rubber or gutta-percha, the sides only may be covered therewith, or only a portion of the sides, it being only absolutely necessary that a sufficient portion of the sides should be covered to insure a smooth friction-surface thereto and a close play thereof in the well; but, however, I have found it desirable, and as producing a much better float, to incase both the side and top surfaces of the float.

The composition of which the hard vulcanized rubber or gutta-percha casing may be made can consist of any of the well-known compounds practiced by india-rubber manufacturers, and therefore I do not intend in my claims to limit myself to any particular composition thereof.

Having thus described my improvements, what I claim as my invention, and desire to have secured to me by Letters Patent, is—

1. Forming a "float" for liquids by combining cork or other buoyant material with a protective covering of rubber or gutta-percha, substantially as described.

2. The combination of the screw-socket $d$, tube or well $i$, and top plate, $k$, arranged together substantially as described, and for the purposes specified.

JOSEPH W. ROSS.

Witnesses:
 JOSEPH GAVETT,
 THOS. J. MAYALL.